United States Patent
Rhoades

(10) Patent No.: US 7,404,926 B2
(45) Date of Patent: Jul. 29, 2008

(54) WATER TREATMENT SYSTEM

(76) Inventor: Frank G. Rhoades, 708 4th St., Hudson, WI (US) 54016

( * ) Notice: Subject to any disclaimer, the term of this patent is extended or adjusted under 35 U.S.C. 154(b) by 0 days.

(21) Appl. No.: 10/747,167

(22) Filed: Dec. 30, 2003

(65) Prior Publication Data

US 2005/0145548 A1    Jul. 7, 2005

(51) Int. Cl.
    *B01D 36/02*    (2006.01)
(52) U.S. Cl. .................. 422/62; 422/101; 210/304; 210/335
(58) Field of Classification Search ............ 422/62, 422/101; 436/55, 163, 177; 210/295, 304, 210/316, 317, 335, 806, 416.1, 743, 744
See application file for complete search history.

(56) References Cited

U.S. PATENT DOCUMENTS

| | | | |
|---|---|---|---|
| 3,909,405 A | 9/1975 | Aoyama | |
| 4,200,526 A | 4/1980 | Johnson et al. | |
| 4,999,116 A | 3/1991 | Bowers | |
| 5,182,023 A | 1/1993 | O'Connor et al. | |
| 5,264,132 A | 11/1993 | Speranza et al. | |
| 5,320,755 A | 6/1994 | Hagqvist | |
| 5,366,634 A * | 11/1994 | Vijayan et al. | 210/638 |
| 5,460,723 A * | 10/1995 | Bourbigot et al. | 210/639 |
| 5,501,798 A * | 3/1996 | Al-Samadi et al. | 210/652 |
| 6,074,561 A * | 6/2000 | Jablonsky | 210/650 |
| 6,113,797 A * | 9/2000 | Al-Samadi | 210/652 |
| 6,368,849 B1 * | 4/2002 | Norddahl | 435/262 |
| 6,454,946 B1 * | 9/2002 | DeFrees | 210/653 |
| 6,623,643 B2 * | 9/2003 | Chisholm et al. | 210/620 |
| 6,954,701 B2 * | 10/2005 | Wolfe | 702/22 |
| 2002/0011450 A1 * | 1/2002 | Kelly et al. | 210/767 |
| 2002/0179545 A1 * | 12/2002 | Rosenberger et al. | 210/806 |
| 2003/0201215 A1 * | 10/2003 | Evanovich et al. | 210/97 |
| 2004/0007358 A1 * | 1/2004 | Lien | 166/275 |
| 2004/0104157 A1 * | 6/2004 | Beeman et al. | 210/232 |

OTHER PUBLICATIONS

Cathryn Hodson, "Membrane Filtration: Live Long and Cost Less", Apr. 1997 *Pollution Engineering*, vol. 29, No. 4.
Web page, Neutralization Chemicals, A White Paper by Wastech Controls & Engineering, Inc., http://www.wastechengineering.com/papers/neutralization_chemicals.htm date unknown.

* cited by examiner

*Primary Examiner*—Jan M. Ludlow
(74) *Attorney, Agent, or Firm*—Skinner & Associates

(57) ABSTRACT

A method and system for treating a fluid containing entrained cementitious particles involves drawing the fluid from a storage location, pre-filtering the fluid, dividing the pre-filtered fluid into a flow of permeate and a flow of bypass by passing said pre-filtered fluid through a tangential flow filter. The permeate flow is fluid that has passed through a polymeric membrane filter media disposed in the tangential flow filter, while the bypass flow is flow exiting said tangential flow filter without passing through said membrane filter media. The system and method also includes a pH probe for testing the pH of the filtrate, and a metering pump operated by a controller which injects a neutralizing agent into the filtrate to reduce the alkalinity of the filtrate before discharge.

15 Claims, 3 Drawing Sheets

WATER TREATMENT SYSTEM

BACKGROUND OF THE INVENTION

1. Field of the Invention

The present invention relates to a waste water treatment apparatus and process. In particular, the invention relates to a water treatment system and process for treating storm and process water in the concrete industry.

2. Description of the Related Art

The ready-mix concrete and concrete-related industries create large amounts of excess water contaminated by high amounts of suspended solids and a pH level near, or above, EPA hazardous guidelines. The contaminated excess water is either in the form of process water or storm water. Storm water is created by rain or snowmelt carrying off yard waste. Plant equipment, slump-racks, tank-fill stations and truck mixer-drum washout produce process water. It is this mixer-drum washout that creates the majority of the contaminated water. Mixer-drum washout water is created when clean water and/or cleaning solution is pumped into a cement mixer to wash out the concrete waste. This waste contains rock, sand, cement, fly ash, and various admixture chemicals. While the rock and sand in the washout stream will settle quickly, entrained cementitious materials are difficult to remove. Cement is made up of finely ground limestone and clay that not only create the difficult-to-settle particulates, but also elevate the pH level of waste water to 12 and above.

The majority of concrete facilities rely upon settling ponds, pits, or tanks to separate coarse aggregate from the waste water. Such facilities may include a second pond or holding tank for receiving the waste water after settling either for re-use, or for pH neutralization prior to discharge. Some of the settling ponds may be of the evaporation/percolation type, wherein some waste water evaporates and other waste water percolates through to the surrounding ground. Eventually such settling ponds become trapped with a buildup of cementitious material, and must be cleaned with earth moving equipment that hauls the solid waste to a landfill, or is abandoned in favor of a new pit or pond. Where separation of materials is attempted within the plant, often the separators are mechanical clarifiers, using drag screws or rotating screws to mechanically separate the aggregate from the water. Screens have also been used.

To the extent that filtration has been attempted, traditional methods of filtration utilizing a barrier-type method have not been effective due to the nature and amount of cementitious particles, which will very quickly foul any known type of barrier media, which usually relies on gravity filtration. In addition to the cost of the barrier media, the amount of maintenance required has made this method uneconomical and ineffective. In addition to the barrier method, sand filters have and are being used. Once again, the clogging nature of cementitious materials renders sand filters somewhat ineffective and unsatisfactory. The cement particles cling to the sand granules and fairly quickly create an increasingly impervious surface layer. Since cement is ground to such a small particle size, some of the cement will still pass through the sand bed into the permeate stream. Furthermore, the flow rates of sand filtration systems are generally fairly low even, with fresh sand media.

While some producers use acids to reduce the high pH level in the contaminated water, they generally use a batch treatment method. In this method, the excess water is caught in some type of storage pit, tank, or container, and then enough acid is introduced to reduce the pH. Since the amount of acid required is dependent upon the amount of suspended solids in the water to be treated, non-filtered water requires an excessive amount of somewhat expensive acid.

Thus, methods of treating excess water in the concrete industry have often been limited to allowing the fluid to settle as much as possible in a settling pit, then simply allowing the remaining liquid to run off. The inventor is not aware of any prior systems or processes that effectively treat excess water from concrete production facilities. Various systems and methods have, however, been devised for treating other types of waste water.

One such process is exemplified in U.S. Pat. No. 5,320,755, issued Jun. 14, 1994 to Hagqvist et al. In this system, an incoming contaminated fluid is pressurized using a first pump and then passed through a filter in which the flow is divided into a filtrate or permeate flow, and a first bypass flow. The first bypass flow is recirculated using a recirculation pump. The bypass flow is provided to continually rinse the filtering membrane and prevent particulate buildup thereon. Between the filter bypass outlet and the recirculation pump is a pressure limiting valve to control the pressure in the filter and first bypass flow. At the outlet of the pressure limiting valve, the flow is divided into a second bypass flow which is returned to a point upstream the first pump, and a waste outlet. This system is not particularly suited for handling the large concentration of suspended solids present in excess water generated in the concrete industries. It would furthermore be desirable to provide a self-contained solution to the contaminated excess water problem.

U.S. Pat. No. 5,182,023, issued Jan. 26, 1993 to O'Connor et al., describes a process for treating arsenic-containing aqueous waste wherein the aqueous waste, treated, if necessary, to minimize the presence of materials which reduce the efficiency of reverse osmosis membranes, is passed through an ultrafilter to remove solids, followed by a chemical treatment to adjust the pH to range from about 6 to 8 and to add antiscalants and antifouling materials, which is then followed by subjecting the chemically treated filtrate to a reverse osmosis process to result in a permeate stream having less than about 50 parts per billion arsenic.

U.S. Pat. No. 4,999,116, issued Mar. 12, 1991 to Bowers, describes a waste water treatment process for the removal of heavy metals. The '116 waste water treatment process is optimized by continuously removing and filtering a sample flow of treated waste water subject to pH level control to determine the presence of remaining metals in solution to be precipitated. Filtering of the sample removes metals precipitated by pH level control.

U.S. Pat. No. 4,200,526, issued Apr. 29, 1980 to Johnson et al., describes a purification process for waste water from a textile plant and other manufacturing processes. After preliminary filtering to remove foreign particles, the waste water is treated with a reducing agent, if needed, and the pH is adjusted to 8.0-9.5. The waste water is then treated with a flocculating agent. After further treatment in a clarifier, the waste water is passed through a sand filter to remove any residual suspended solids. The pH is adjusted to below about 6.0 and the waste water is then subjected to reverse osmosis.

U.S. Pat. No. 3,909,405, issued Sep. 30, 1975 to Aoyama, describes a method for treating an acidic or alkaline waste liquid containing aluminum dissolved therein to convert it to a neutral liquid free from colloidal aluminum hydroxide. The aluminum is hydrolyzed in the presence of crystalline aluminum oxide. The crystalline aluminum oxide has an average particle diameter of about 0.5 to about 500 microns.

U.S. Pat. No. 5,264,132, issued Nov. 23, 1993 to Speranza et al., describes a method for removing ammonia, organic amines and alkaline impurities from waste water which comprises using a partially spent ion exchange resin which no longer meets the purity requirements for the production of methyl-tert-butylether (MTBE), washing the catalyst with water, contacting it with waste water, and removing the purified filtrate.

The April, 1997 issue of *Pollution Engineering*, published by Cahners Publishing Company, discusses membrane filtration in an article entitled, "Membrane Filtration: Live Long and Cost Less", writted by Cathryn Hodson, which is incorporated herein in its entirety. Although no specific system is laid out, this article explains many known aspects of membrane filtration.

A web page entitled "Neutralization Chemicals including Neutralizing Acid, Base and Alkaline Chemicals", published at least as of Dec. 17, 2003 by Wastech Controls and Engineering, Inc., teaches various chemicals and processes for neutralizing alkaline waste water.

None of the above disclosures, taken either singly or in combination, is seen to describe the instant invention as claimed. Thus a water treatment system solving the aforementioned problems is desired.

SUMMARY OF THE INVENTION

The water treatment system of the present invention is a system for treating waste water in concrete plants and other facilities processing concrete products which are required to comply with environmental regulations governing the maximum particulate matter and pH level in waste water. The system for treating waste water containing entrained cementitious particles comprises a polymeric membrane tangential flow filter, a metering pump, a first line receiving the waste water under pressure which is connected to an inlet of the filter, a second line passing permeate from a permeate outlet of the filter to a flow meter, a third line passing permeate from the flow meter to an injection valve, and a fourth line passing permeate flow from the injection valve to a mixing means. The injection valve receives neutralizing fluid from the metering pump. A fifth line extends from the mixing means to a pH probe. A controller receives a first signal from the flow meter indicative of a flow rate of the permeate and a second signal from the pH probe indicative of a pH level of the permeate, the controller sending a signal to the metering pump to dispense sufficient neutralizing fluid into the permeate to reduce a pH level of the permeate to an acceptable level.

A method for treating a fluid containing entrained cementitious particles includes drawing the fluid from a storage location, pre-filtering the fluid, dividing the pre-filtered fluid into a flow of permeate (i.e., filtrate) and a flow of bypass by passing said pre-filtered fluid through a tangential flow filter. The permeate flow is fluid that has been filtered by passing through a polymeric membrane filter media disposed in the tangential flow filter, while the bypass flow is flow exiting said tangential flow filter without passing through said membrane filter media.

The invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
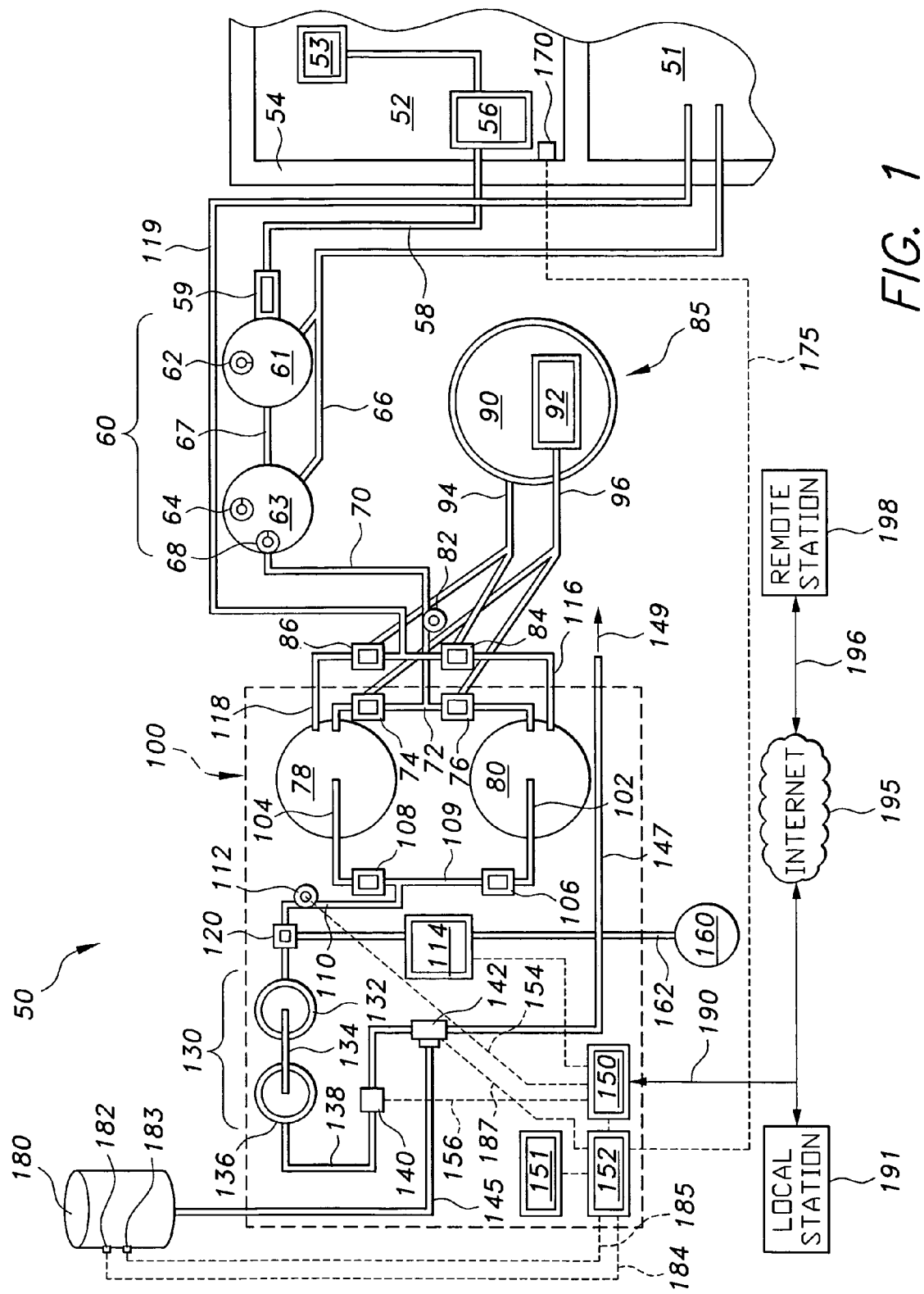
FIG. 1 is an exemplary diagrammatic view of a water treatment system according to the present invention.

FIG. 1 schematically represents an exemplary embodiment of a proposed contaminated water treatment system 50. Power distribution lines are not shown for clarity. Untreated, contaminated water containing entrained cementitious particles accumulates in a storage container such as settling pit 52, which may be a final settling pit downstream from a series of pits starting with drying pit 51, as is known in the concrete production industry. For example, there may be one or more intermediary settling pits (not shown) between drying pit 51 and settling pit 52. The pits are separated by pit wall 54 and a weir (not shown), allowing fluid to pass between adjacent pits.

Pump 56 draws fluid from settling pit 52. Pump 56 may be any type of pump known for drawing water from a reservoir. For example, a floating suction line may be used. The floating suction line keeps the suction line opening 53 at a measured distance below the surface of the water and avoids the buildup of solids on the bottom. Suction line opening 53 may include a screen to prevent large solids from entering water line 58.

Pressurized waste water enters line 58 from pump 56. Line 58 extends to main inlet valve 59. After main inlet valve 59, untreated fluid passes through pre-filtration means 60. Pre-filtration means 60 initially removes particles over between about 10 microns to about 100 microns. For example, prefiltration means 60 may include filter media having pore sizes of about 25 microns, thereby trapping particles larger than about 25 microns in diameter. In a first exemplary embodiment, each pre-filter includes a pressure vessel and filter media interposed between an inlet and outlet of the pressure vessel. While other filter types and shapes are contemplated, it has been found that polypropylene, non-inserted, glazed felt bag filters are suitable. Such bag filters are commercially available from, for example, Filter Specialists, Inc. of Michigan City, IN.

In a first exemplary embodiment, pre-filtration means 60 includes a first stage pre-filter 61 having a bag filter with a pore size of about 100 microns, a second stage pre-filter 63 having a bag filter with a pore size of about 25 microns, and a line 67 extending from the permeate outlet of pre-filter 61 to the inlet of pre-filter 63.

There also may be a plurality of first stage filters 61 and/or second stage filters 63 arranged in parallel (not shown) for increased capacity or as stand-by in case one becomes full and the filter media needs replacement. For example, with two first stage 100-micron filters arranged in parallel (only one shown), and a single 25-micron second stage filter, the bag filters tend to fill up together and require replacement at about the same time.

Each pre-filter 61, 63 includes a drain leading to return line 66, which terminates at drying pit 51. Return line 66 is used when emptying and cleaning out pre-filters 61, 63. In addition, each pre-filter 61, 63 includes a respective pressure gauge 62, 64. Second stage pre-filter 63 also includes a pressure gauge 68 at the outlet thereof so that the pressure differential across each filter media, which provides an indication of the extent of loading of the filter media, can be determined.

In an alternative embodiment, pre-filtration means 60 comprises one or more automatic self-cleaning filters such as those available from Amiad of Oxnard, Calif. and Orival of Englewood, N.J. These may include first and second stage pre-filters 61, 63 connected in series for first and second stage pre-filtering. Alternatively, pre-filtering means 60 may include both first and second stage pre-filtering in a single unit. Other similar known filtration systems for screening particles greater than about 10 to 100 microns in size are also contemplated.

Line 70 extends from the permeate outlet of second stage pre-filter 63 to the main filtration apparatus mounted to skid 100. Skid 100 is a type of platform that accommodates a fork-lift. Skid 100 includes a metal frame 200, shown in FIGS. 2 and 3, and contains a majority of the components of water treatment system 50. Skid 100 allows for compact configuration of the components to save space, including electrical control and power distribution to powered components, and provides reliable rigid plumbing, as well as providing an easy means for moving the system from one location to another, e.g., using a fork lift. Note that, for clarity, FIGS. 2 and 3 do not show electrical signal lines or power distribution lines.

Figure 2:
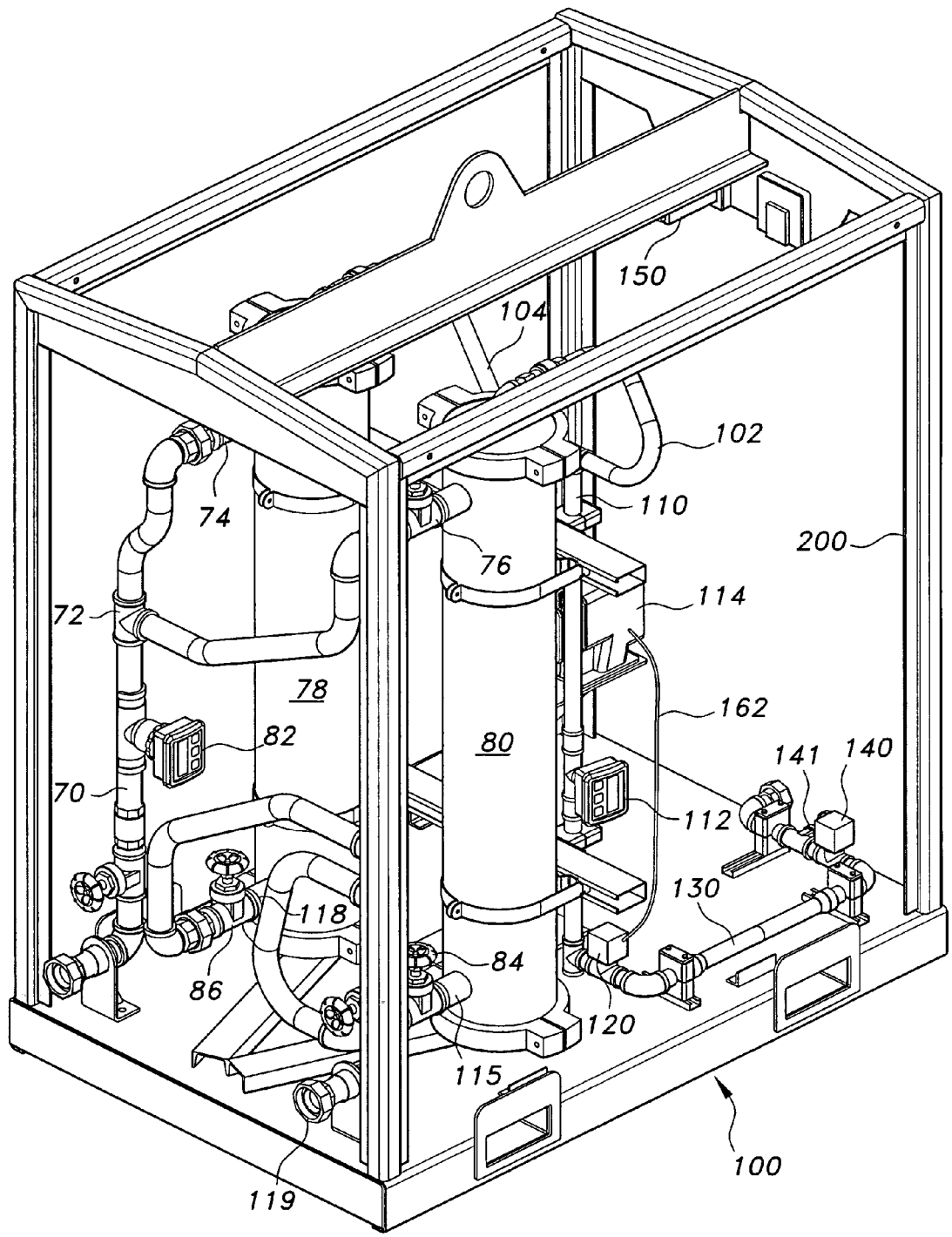
FIG. 2 is a perspective view of a skid containing the major components of the water treatment system of FIG. 1.
Figure 3:
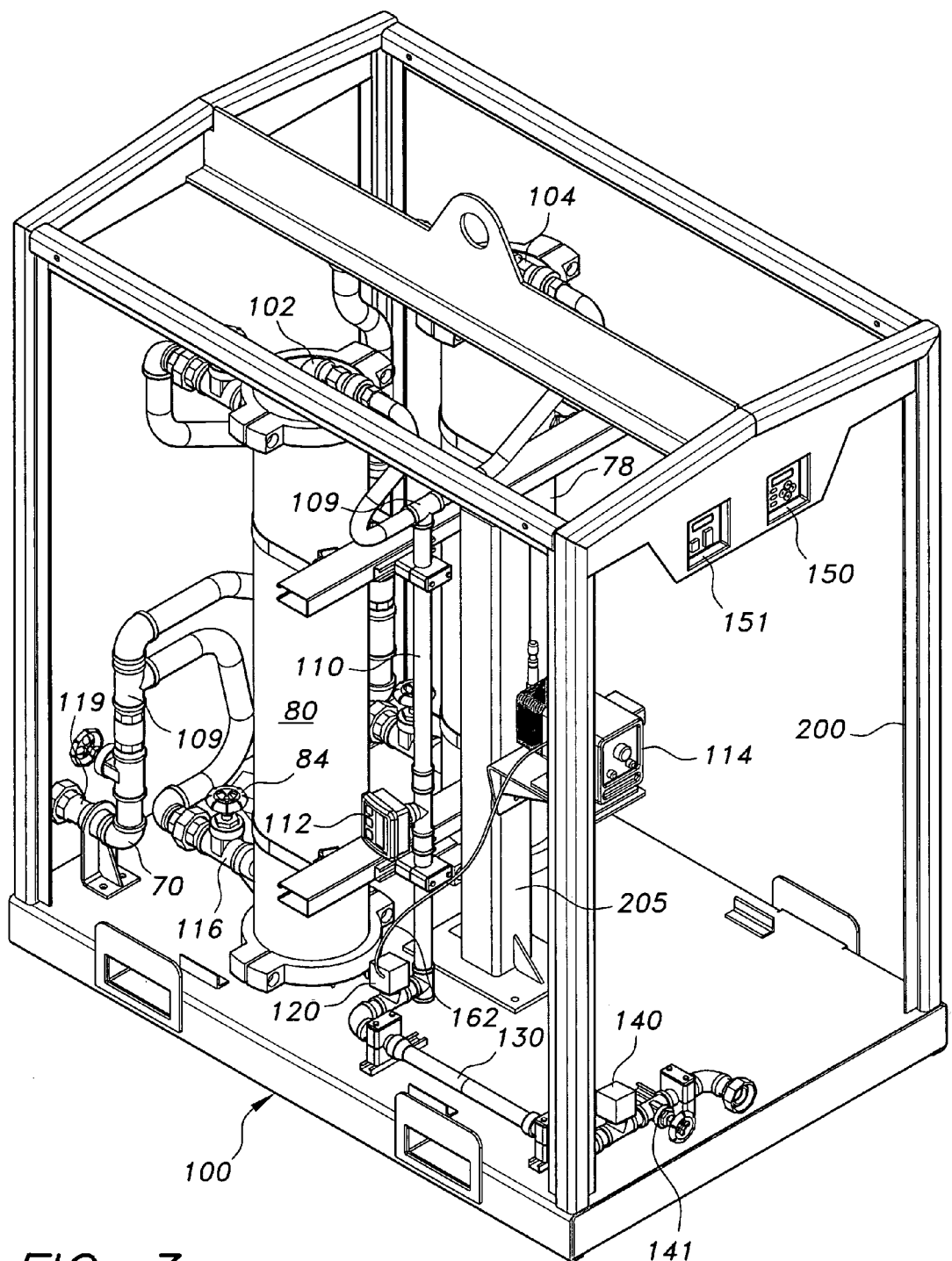
FIG. 3 is a perspective view of the skid shown in FIG. 2 as seen from a reverse angle.

Referring now to FIGS. 1-3, line 70 extends to T-connection 72, which divides the flow to first inlet control valve 74 and a second inlet control valve 76. Flow meter 82, shown in FIG. 2, informs the operator and/or controller 150 as to the volume flow rate of fluid into the main filtration system. Each inlet control valve 74, 76 controls the inflow of contaminated, pre-filtered water to respective first and second microfiltration polymeric membrane filters 78, 80. Polymeric membrane filters 78, 80 include membrane filters disposed within pressure vessels or housings which receive waste water under pressure and pass the waste water tangentially across the membrane filters. Polymeric membrane filters 78, 80 may have uniform pore sizes from about 0.01 microns to about 0.2 microns. In an exemplary embodiment, membrane filters 78, 80 comprise spiral-wound polyvinylidene fluoride (PVDF) membranes with pore size of about 0.01 micron. Such filtration membranes are available from Septro Membranes of Oceanside, Calif. Capacity of the filtration system can be increased by adding more or larger-sized filters.

All cementitious particles, color pigments, oils, and admixture chemicals are rejected by the membranes and returned to drying pit 51 via bypass line 119. The selected pore size affects the frequency of cleaning and the life expectancy of the membranes. Membranes are available in 2-, 4-, 6-, and 8-inch diameters (5, 10, 15, and 20 cm). The proper diameter will provide consistent operation and should be determined based on the amount of excess water.

Spiral-wound membrane filters are tangential flow filters, in which liquid flows across the surface of the filter media under pressure and at a sufficient velocity to keep the membrane substantially free of particulate build-up. Thus, the filter divides an incoming flow of fluid into a permeate flow and a bypass flow (also known as the retentate flow). The permeate flow is fluid that passes through the filter media while the bypass or retentate flow is fluid discharged from the filter without passing through the media. The bypass flow therefore has a higher concentration of particulates than the flow of fluid entering the filter while the permeate is substantially free of particulates larger than the pore size of the filter media. However, the permeate exiting filters 78, 80 will typically be highly alkaline, with pH levels above 10-12. Therefore, to meet EPA specifications for effluents, the permeate must be treated with a neutralizing agent.

Permeate exits polymeric membrane filters 78, 80 through respective permeate outlets 104, 102 to control valves 108, 106 (FIG. 1). Permeate exiting control valves 108, 106 then combines at T-connection 109 and enters line 110. Meanwhile, bypass flow is discharged through lines 118, 116 to respective control valves 86, 84. Control valves 86, 84 normally direct fluid back to drying pit 51 via bypass line 119.

Flow meter 112 measures the volume flow rate of permeate passing through line 110. This information is passed to controller 150 via signal line 154 (FIG. 1). Downstream of flow meter 112, permeate is optionally combined with neutralizing agent at injection valve 120 to reduce the pH to an acceptable level. The neutralizing agent may be an acid, including sulfuric acid ($H_2SO_4$), hydrochloric acid (HCl), phosphoric acid ($H_3PO_4$), or nitric acid ($HNO_3$), citric acid, solutions thereof, or other known acids suitable for neutralizing the basic permeate. Alternatively, the neutralizing agent may be carbon dioxide ($CO_2$), which converts in water to carbonic acid ($H_2CO_3$). One advantage to carbon dioxide is that the gas is non-hazardous and self-buffering, so that, regardless of dosage, it will not lower the pH below 7.5-7.0. If the treated water is simply to be stored for re-use, e.g., for cleaning out concrete mixers, then it need not be treated with neutralizing agent. However, if the treated water is to be released, the fluid should have a pH value of between 7 and 9.

The neutralized fluid then passes through mixing means 130 to ensure that the neutralizing agent is thoroughly mixed with the permeate. In one exemplary embodiment, mixing means 130 comprises two static mixers, e.g., ribbon-type static mixers, connected in series. As shown in FIG. 1, mixing means 130 comprises two vertically disposed static mixers 132, 136 connected in series by pipe 134. Static mixers are available commercially and are designed to put the fluid flow through a tortuous route, dividing and recombining the flow many times. Since the pH-level of the permeate flow is quite constant, it has been found that larger static mixers, e.g., 3-6 inches (8-15 cm) in diameter are more effective due to the longer retention time.

In an alternative embodiment (not shown), mixing means 130 comprises a mixing tank, including a chemical injection valve and a mixing pump. The use of a mixing tank reduces the amount of required piping and eliminates the need for static mixing equipment.

The permeate (filtrate) is carried downstream of mixing means 130 by pipe 138, where the pH of the treated water is measured using pH probe 140. A signal indicative of the pH level is transmitted to controller 150 via signal line 156 (FIG. 1). In response to the pH level measured by pH probe 140 and the volume flow rate of permeate at volume flow meter 112, controller 150 operates chemical metering pump 114 which draws neutralizing agent from storage drum 160 via line 162. Neutralizing agent is passed to injection valve 120 under pressure, which causes injection valve 120 to open so that only the intended amount of neutralizing agent is dispensed. By locating injection valve 120 downstream of membrane filters 78, 80, significantly less neutralizing agent is required for reducing the pH level to acceptable levels.

Electrical panel 152 is connected to power switch 151 to start and stop the system by cutting power off to the various pumps, pressure meters, flow meters, pH probes, etc. Electrical panel 152 is also responsive to level switch 170 in settling pit 52. When the fluid level in settling pit 52 reaches a lower threshold, fluid level switch 170 signals electric distribution panel 152 via electrical line 175. The panel 152 responds by shutting power off to the system. This prevents damage to the pumps and other equipment when settling pit 52 is emptied. Although not shown in FIGS. 2 and 3, electrical panel 152 is preferably mounted to post 205 and elevated above the floor of skid 100.

Three-way electrically controlled valve 142 (FIG. 1) directs treated fluid out discharge line 145 or line 147. Under normal conditions, treated fluid will flow, or be pumped, to a storage tank 180 via line 145. If the tank 180 reaches its capacity, a first level switch 182 sends a signal to the electric distribution panel 152 via electrical line 184. The panel 152 then signals three-way valve 142 to route the filtered and pH balanced permeate via line 147 to another storage vessel (not shown), or to drying pit 51, or allows runoff in a condition that meets EPA guidelines at outlet 149. As the treated water stored in tank 180 is used by production, another level switch 183 signals electrical distribution panel 152 via electrical line 185. The panel 152 again routes the permeate to the storage tank 180 via conduit 145.

FIGS. 2, 3 show an alternative embodiment in which a single gate valve 141 controls fluid exiting skid 100. Fluid exiting discharge line 145 is free of harmful particles and is pH-balanced to meet EPA guidelines for fluid discharge. Treated fluid exiting skid 100 can be manually directed to any desired location.

Periodically, membrane filters 78, 80 require cleaning to remove cementitious particles and other foreign matter from the filter membranes. Cleaning system 85, shown schematically in FIG. 1, allows for such periodic cleaning. Tank 90 is cone-shaped, with the point (not shown) directed down, leading to a stopcock (not shown). Cleaning pump 92 circulates cleaning fluid from tank 90 through filters 78, 80 via conduit 96, the cleaning fluid being returned to tank 90 via conduit 94. The cleaning fluid advantageously comprises a low-foam, acidic detergent specifically formulated for cleaning concrete waste, such as that available from Romix of Euless, Tex. and other companies.

One or both polymeric membrane filters 78 and 80 are cleaned by flushing the cleaning fluid from cleaning tank 90 through filters 78, 80 and across the surface of the membranes therein. Once the cleaning is complete, the resulting particulate captured in the cleaning tank settles and can be dropped out the bottom of the tank, allowing reuse of a majority of the cleaning chemicals. Timing of the cleaning cycle is determined by a combination of pressure differential and a specified reduction of the permeate flow.

Control of valves 74, 76, 84, 86, 106, and 108, can be orchestrated so that one of filters 78, 80 be actively filtering excess water while the other of filters 78, 80 is being cleaned. This would allow for continuous operation of the filtration system.

Controller 150 receives input from flow sensor 112 and pH sensor 140, and from this information dispenses neutralizing fluid by outputting a signal to metering pump 114. An exemplary metering pump that is suitable for the water treatment system and that is available commercially is the EBW15 metering pump available from Walchem of Holliston, Mass.

An exemplary controller that is suitable for the intended purposes and is commercially available is the Walchem WBH320 Webmaster controller. This unit allows for remote monitoring via a computer that may be located locally, e.g., local station 191, communicating by line 190, which may be any type of communication line such as a LAN, serial cable, wireless connection, etc. Alternatively, the computer may be located remotely at remote station 198. If located remotely, remote station 198 can communicate via Internet 195 by line 196 and signal line 190, which may be an Ethernet connection, or a dial-up connection to an Internet Service Provider. Remote station 198 may also communicate with controller 150 by a direct dial-up connection (not shown).

Various modifications to the system are contemplated. For example, pre-filtration means 60 may be positioned on skid 100 and rigidly plumbed to the rest of the system located on skid 100. This improves portability and reliability of the system. Furthermore, the pressure differential across first- and second-stage pre-filters 61 and 63 can be electronically monitored and the system shut down if the pressure differential exceeds a selected threshold.

It is to be understood that the present invention is not limited to the embodiments described above, but encompasses any and all embodiments within the scope of the following claims.

I claim:

1. A system for treating concrete process waste water containing entrained cementitious particles, the system comprising:

a pre-filtering means for receiving waste water from an input line and filtering relatively large particulate matter from the waste water, said pre-filtering means having a first output line;

at least one polymeric membrane tangential flow filter connected to said output line of the pre-filtering means, and having a pressure vessel adapted for receiving the waste water under pressure, a polymeric membrane filter disposed within the pressure vessel, for filtering relatively small particulate matter from the waste water, and a second output line for discharging filtered waste water;

pH adjusting means for adjusting the pH of waste water filtered by the at least one polymeric membrane tangential flow filter, said pH adjusting means connected to said second output line downstream of said pre-filtering means and said polymeric membrane tangential flow filter;

said pH adjusting means including:

a reservoir containing a quantity of neutralizing agent;

a flow meter connected to said second output line for measuring the flow rate of the filtered waste water;

a metering pump connected to said reservoir for metering the neutralizing agent from said reservoir into the filtered waste water;

an injection valve receiving neutralizing agent from said metering pump, and connected to said second output line downstream of said pre-filtering means and said flow meter, said injection valve injecting the neutralizing agent into the filtered wastewater;

a pH probe connected to said second output line downstream of said injection valve for measuring the pH of the filtered waste water; and a controller electrically connected to the flow meter, the metering pump, the injection valve and the pH probe, the controller being programmed to signal the metering pump to maintain the pH of the filtered waste water between predetermined limits;

whereby said controller is adapted to be computer monitored via a connection selectively chosen from the group consisting of local and internet connections;

mixing means, connected to said second output line, for mixing the neutralizing agent with the filtered waste water;

a housing including a base and a frame mounted on the base, said base forming a skid adapted for moving the system using a forklift, whereby said filter, said mixing means, and said pH adjusting means are mounted on said skid and within said frame, said housing being adapted for transportation and protection of the system;

a container connected to said second output line for storing the filtered and pH adjusted waste water;

wherein the filtered and pH adjusted waste water is reusable; and means for disposing the filtered particulate matter.

2. The system for treating waste water according to claim 1, wherein said predetermined limits are a pH between about 7 and 9.

3. The system for treating waste water according to claim 1, wherein said mixing means comprises a static mixer.

4. The system for treatment of waste water according to claim 1 wherein said skid further comprises an electrical panel and a power switch mounted thereto, said electrical panel distributing electrical power to said metering pump, said flow meter and said pH probe.

5. The system for treatment of waste water according to claim 1, wherein said pre-filtering means comprises a pre-filter for trapping particles larger than between about 10 microns and 100 microns in diameter.

6. The system for treatment of waste water according to claim 1, wherein said pre-filtering means comprises means for trapping particles larger than about 25 microns in diameter.

7. The system of claim 1, wherein said pre-filtering means comprises: a pressure vessel having an inlet and an outlet; and a polypropylene felt bag filter disposed between the inlet and the outlet.

8. The system for treatment of waste water according to claim 1, further comprising a storage tank connected to said pH adjusting means for storing the filtered and pH adjusted waste water.

9. The system for waste water treatment according to claim 8, further comprising: a limit switch connected to the storage tank for determining when the storage tank is full; and means for diverting the treated waste water to a discharge outlet.

10. The system for treatment of waste water according to claim 1, wherein said polymeric membrane tangential flow filter further comprises a bypass line for bypassing the waste water around the membrane filter.

11. The system for treatment of waste water according to claim 1, wherein said at least one polymeric membrane tangential flow filter comprises two polymeric membrane tangential flow filters connected in parallel.

12. The system for treatment of waste water according to claim 1, further comprising a cleaning system having: a cleaning solution storage tank having a return line connected to said membrane filter; a cleaning pump connected to said storage tank and having a cleaning conduit connected to said membrane filter for passing cleaning fluid from the storage tank to said membrane filter.

13. The system for waste water treatment according to claim 1, wherein said polymeric membrane filter comprises a spiral-wound filter.

14. The system for waste water treatment according to claim 1, further comprising a pump connected to said polymeric membrane tangential flow filter, the pump being adapted for pumping untreated waste water into said filter under pressure.

15. A system for treating concrete process waste water containing entrained cementitious particles, the system comprising:
a pre-filtering means for receiving waste water from an input line and filtering relatively large particulate matter from the waste water, said pre-filtering means having a first output line;
at least one polymeric membrane tangential flow filter connected to said output line of the pre-filtering means, and having a pressure vessel adapted for receiving the waste water under pressure, a polymeric membrane filter disposed within the pressure vessel, for filtering relatively small particulate matter from the waste water, and a second output line for discharging filtered waste water;
pH adjusting means for adjusting the pH of waste water filtered by the at least one polymeric membrane tangential flow filter, said pH adjusting means connected to said second output line downstream of said pre-filtering means and said polymeric membrane tangential flow filter;
said pH adjusting means including:
a reservoir containing a quantity of neutralizing agent;
a flow meter connected to said second output line for measuring the flow rate of the filtered waste water;
a metering pump connected to said reservoir for metering the neutralizing agent from said reservoir into the filtered waste water;
an injection valve receiving neutralizing agent from said metering pump, and connected to said second output line downstream of said pre-filtering means and said flow meter, said injection valve injecting the neutralizing agent into the filtered wastewater;
a pH probe connected to said second output line downstream of said injection valve for measuring the pH of the filtered waste water; and
a controller electrically connected to the flow meter, the metering pump, the injection valve and the pH probe, the controller being programmed to signal the metering pump to maintain the pH of the filtered waste water between predetermined limits;
mixing means, connected to said second output line, for mixing the neutralizing agent with the filtered waste water;
a container connected to said second output line for storing the filtered and pH adjusted waste water; and
wherein the filtered and pH adjusted waste water is reusable.

* * * * *